Jan. 13, 1959 P. FRIEL 2,868,485
I-BEAM ATTACHMENT CLAMP
Filed July 25, 1955 2 Sheets-Sheet 1
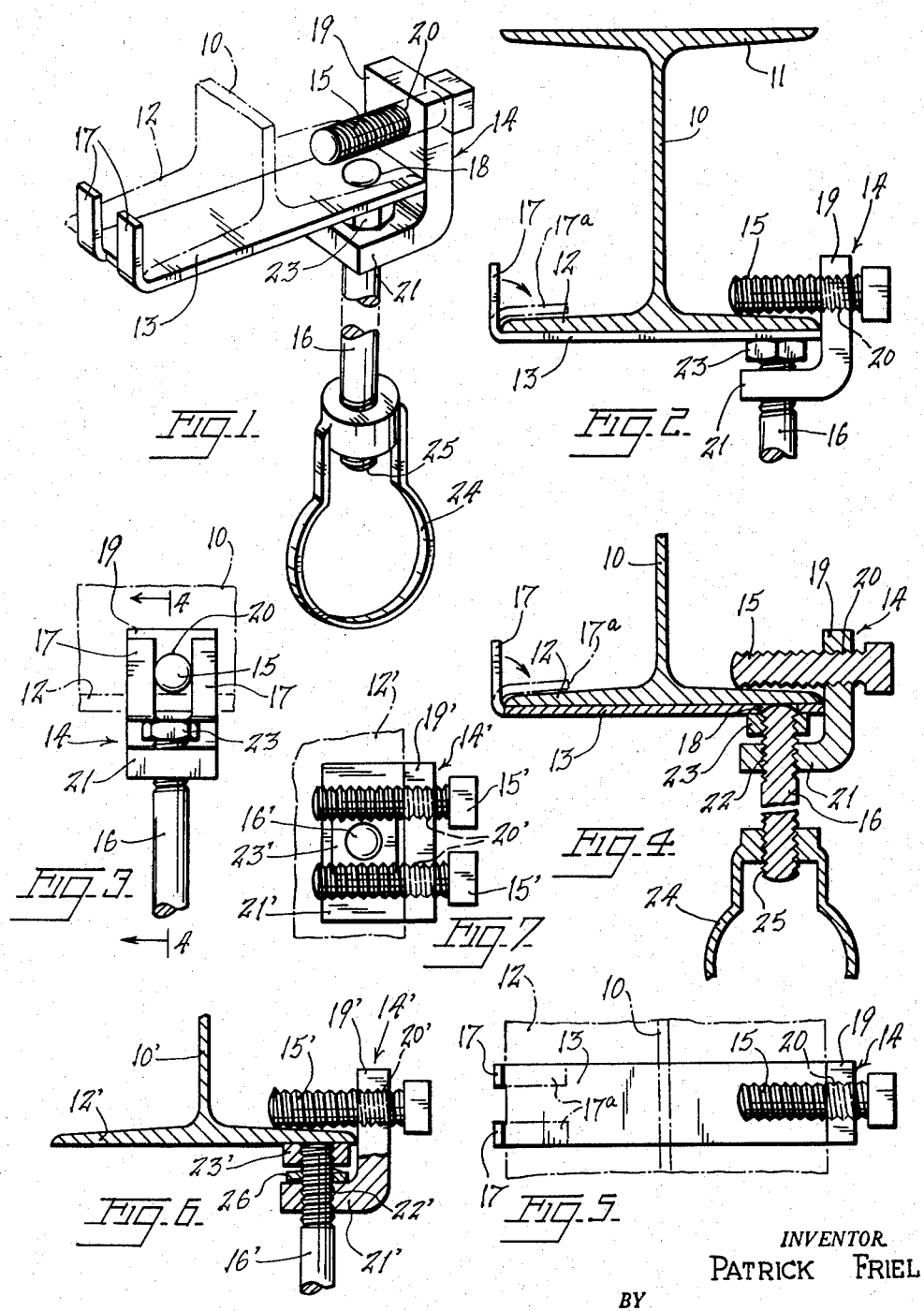
INVENTOR.
PATRICK FRIEL
BY
ATTORNEY

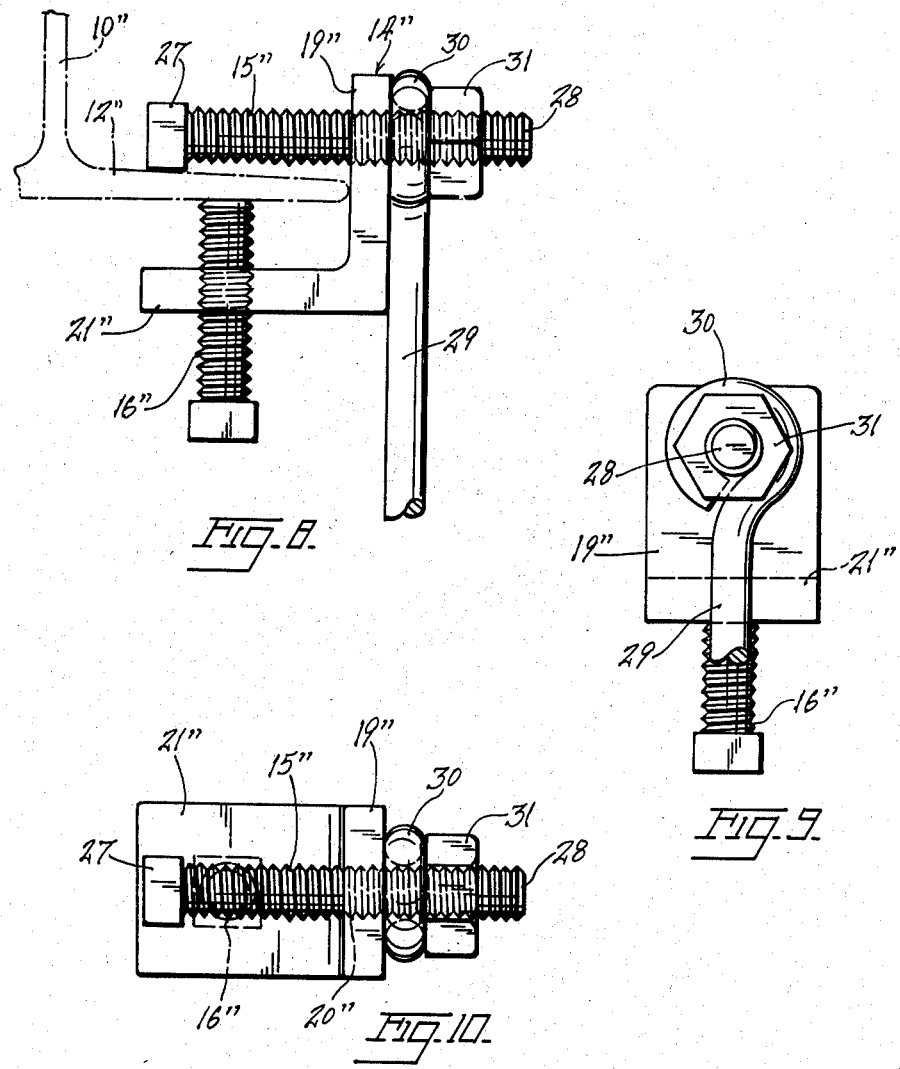

United States Patent Office 2,868,485
Patented Jan. 13, 1959

2,868,485

I-BEAM ATTACHMENT CLAMP

Patrick Friel, Richmond Hill, N. Y.

Application July 25, 1955, Serial No. 523,959

2 Claims. (Cl. 248—59)

This invention relates to pipe hangers such as disclosed in my previous Patent Number 2,675,201, issued on April 13, 1954, and more particularly to new and useful improvements in a clamping device for attaching a pipe hanger to an I-beam or the like.

In building constructions having floors or roofs supported by I-beams, it is frequently necessary to suspend different devices from the I-beams. For example, in installing gas, steam, water or sprinkler pipe lines, electric cables or other analogous service units, it is often desirable and sometimes necessary to attach hangers to said beams.

It is a principal object of the present invention therefore to provide an attachment clamp for application to I-beams and the like for supporting various types of hangers.

Another object of the present invention is to provide an attachment clamp of this character which securely and positively holds a hanger in suspended position from the I-beam.

A further object of the invention is to provide an attachment clamp of this kind which may be quickly and easily applied and removed from a supporting flange and which will, when properly applied, be capable of supporting great loads from the flange without danger of breaking or being accidentally displaced from the flange.

A still further object of the invention is to provide an attachment clamp of this kind which may be positively locked on a supporting flange, which is simple and rugged in construction, and which may be manufactured at a reasonable cost.

In carrying out the aforesaid objects, according to one form of the invention, a clamping bracket of angle iron of heavy stock has both angular portions thereof formed with aligned central screw-threaded openings for removably and adjustably receiving clamping bolts therein, one of said bolts constituting a hanger rod. A flat plate or strap of sheet metal spans the underside of the I-beam bottom flange transversely thereof and is bent upwardly at one end to form upstanding spaced finger portions adapted to abut against one long side edge of the flange of the I-beam to prevent lateral displacement of the clamping device in one direction. At its other end, the plate or strap is formed with an opening to receive the combined bolt and hanger rod. The latter clamping bolt and hanger rod is provided with a nut adapted to be set up against the plate or strap for clamping same against the flange of the I-beam.

In a modification of the invention, the spanning plate is omitted and the nut on the clamping bolt is set up directly against the flange of the I-beam for clamping the clamping bracket on said flange. A lock washer is interposed between the end of the clamping block and the nut for securely holding the clamping bracket against displacement.

According to another modification of the invention, the angular clamping bracket has a single screw-threaded opening in one angular portion thereof and a plurality of screw-threaded openings in the other angular portion thereof disposed on both sides of the opening in the other angular portion for receiving a plurality of clamping bolts.

In another modification of the invention, the hanger rod is separate from the clamping bolts but is supported on one of said clamping bolts and is secured to the bracket by a nut.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a pipe hanger embodying one form of my invention, the I-beam being shown in dot-dash lines.

Fig. 2 is a side elevational view thereof, the I-beam being shown in section and parts being omitted.

Fig. 3 is an end view thereof looking toward the right in Fig. 2.

Fig. 4 is a vertical sectional view taken on the plane of the line 4—4 of Fig. 3.

Fig. 5 is a top plan view thereof.

Fig. 6 is a view similar to Fig. 4 but illustrating a pipe hanger embodying a modified form of the invention.

Fig. 7 is a top plan view thereof.

Fig. 8 is a side elevational view of another modification of the invention.

Fig. 9 is an end view thereof looking toward the left of Fig. 8, parts being broken away.

Fig. 10 is a top plan view thereof.

Referring to the first form of the invention shown in Figs. 1 to 5, inclusive, the pipe hanger shown herein is adapted for attachment to an I-beam of conventional form having a central web 10 and upper and lower flanges 11 and 12, respectively.

The clamping device includes an elongated flat plate or strap 13, a right angular clamping bracket 14, a headed bolt 15 and a nut-equipped combined clamping bolt and hanger rod 16. The plate or strap is bent upwardly at one end to form a pair of spaced finger portions 17 and at its other end is formed with a smooth-walled opening 18. One of the angular portions of the clamping bracket 14, the vertical portion 19 as viewed in Fig. 1, is formed with a central threaded opening 20 to receive the headed bolt 15 in parallel relationship to the other angular portion 21 which is disposed horizontally. The horizontal portion 21 is formed with a central threaded opening 22 to receive the combined clamping bolt and hanger rod 16 perpendicularly to the bolt 15. The upper end of the combined clamping bolt and hanger rod 16 which projects through the opening 22 is equipped with a nut 23.

When the clamping device is applied to the lower flange 12 of the I-beam as shown in Fig. 4, the clamping bracket 14 is disposed along one long side edge of the flange with its vertical portion 19 abutting against said long side edge, with its horizontal portion 21 extending underneath the flange and with its horizontally disposed clamping bolt 15 extending over the upper surface of said flange. The plate or strap 13 extends across the bottom surface of the flange with its finger portions 17 clinched over the opposite side edge of the flange as indicated at 17ᵃ in dot-dash lines. The combined clamping bolt and hanger rod 16 is disposed in alignment with the opening 18 in the plate or strap, with its nut 23 underneath the plate or strap. When the nut is turned upwardly into engagement with the plate or strap, said plate or strap is brought into close engagement with the bottom surface of the bottom flange 12 of the I-beam, the top end of the bolt or rod 16 impinges against the flange 12, and the headed bolt 15 is drawn down into tight engagement with the top surface of said bottom flange whereby the threads thereof become sufficiently embedded therein so that, coacting with the finger portions 17 of the plate or strap 13, any tendency of the clamping device to become displaced on the flange is eliminated, and the clamping device is thereby positively locked on the flange.

A hanger 24 for supporting a pipe or the like may be threaded onto the bottom threaded end 25 of the combined clamping bolt and hanger rod 16.

The pipe hanger shown in Figs. 6 and 7 differs from the form shown in Figs. 1 to 5, inclusive, in that the plate or strap 13 is omitted and the clamping bolt and hanger rod 16', which extends through the opening 22' in the horizontal portion 21' of the bracket 14', impinges directly against the bottom surface of the bottom flange 12' of the I-beam 10'. A split locking washer 26, however, is interposed between the horizontal portion 21' of the clamping bracket 14' and the nut 23' for locking the nut against displacement. Furthermore, in this form, the vertical portion 19' of the bracket is formed with two spaced screw-threaded openings 20' disposed on both sides of the opening in the horizontal portion 21' to receive two clamping bolts 15'.

In the modification of the invention illustrated in Figs. 8 to 10, inclusive, the bracket 14'' carries headed clamping bolts 15'' and 16'' in the threaded openings in both angular portions 19'' and 21'', respectively, thereof. The plate 13 is missing and the clamping bolt 16'' impinges directly against the flange 12'' of the I-beam 10''.

This form of the invention differs from the other forms also in that the head 27 of the horizontally disposed clamping bolt 15'' is disposed inwardly of the vertical angular portion 19'' of the bracket in clamping engagement with the flange 12'' of the I-beam with its other end 28 protruding outwardly of the bracket.

A hanger rod 29, separate from the clamping bolts, is also provided in this modification. The hanger rod is formed with a hooked end 30 which is adapted to encircle the protruding end 28 of the clamping bolt 15'' for supporting the hanger rod in dependent fashion on the clamping bolt. A nut 31 clamps the hooked end of the hanger rod against the bracket 14''. The hanger rod is adapted to support a hanger (not shown) similar to the hanger 24 of the form of Figs. 1 to 5, inclusive.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A clamping device for supporting a hanger on a flanged beam comprising an angular clamping bracket having vertical and horizontally disposed angular portions, with centrally aligned vertically and horizontally disposed screw-threaded openings therein, said vertical angular portion being adapted to abut against one long edge of a beam flange, a clamping bolt threaded through the horizontal opening in the vertical portion of the bracket and being adapted to overlie the upper surface of the beam flange, a combined clamping bolt and hanger rod threaded through the vertically disposed opening in the horizontal portion of the bracket and being disposed at right angles to the clamping bolt mounted on the vertical portion, an elongated plate adapted to extend across the bottom surface of the beam flange with one end disposed between said clamping bolt and said combined clamping bolt and hanger rod, means on the other end of said plate for abutting against the opposite long side edge of the beam flange, means on one end of the combined clamping bolt and hanger rod for drawing the plate and clamping bolt into clamping engagement with the beam flange, and a hanger removably mounted on the other end of the combined clamping bolt and hanger rod for supporting a pipe or the like.

2. A clamping device for supporting a hanger on a flanged beam comprising an angular clamping bracket having vertical and horizontally disposed angular portions, with centrally aligned vertically and horizontally disposed screw-threaded openings therein, said vertical angular portion being adapted to abut against one long edge of a beam flange, a clamping bolt threaded through the horizontal opening in the vertical portion of the bracket and being adapted to overlie the upper surface of the beam flange, a combined clamping bolt and hanger rod threaded through the vertically disposed opening in the horizontal portion of the bracket and being disposed at right angles to the clamping bolt mounted on the vertical portion, an elongated plate adapted to extend across the bottom surface of the beam flange with one end disposed between said clamping bolt and said combined clamping bolt and hanger rod, integral finger portions on the other end of said plate for abutting against the opposite long side edge of the beam flange to prevent displacement of the bracket, the interposed end of the plate having a smooth-walled opening to receive the inner end of the combined clamping bolt and hanger rod, a nut on the inner end of the inner end of the combined clamping bolt and hanger rod for drawing the plate and clamping bolt into clamping engagement with the beam flange, and a hanger removably mounted on the outer end of the combined clamping bolt and hanger rod for supporting a pipe or the like.

References Cited in the file of this patent

UNITED STATES PATENTS

| 2,375,513 | Bach | May 8, 1945 |
| 2,470,991 | Kindorf et al. | May 24, 1949 |
| 2,675,201 | Friel | Apr. 13, 1954 |

FOREIGN PATENTS

| 611,337 | Great Britain | Oct. 28, 1948 |